United States Patent
Hagi

(10) Patent No.: US 9,865,376 B2
(45) Date of Patent: Jan. 9, 2018

(54) SHIELDED CONDUCTIVE PATH

(71) Applicant: SUMITOMO WIRING SYSTEMS, LTD., Yokkaichi, Mie (JP)

(72) Inventor: Masahiro Hagi, Yokkaichi (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 137 days.

(21) Appl. No.: 14/904,516

(22) PCT Filed: Jul. 16, 2014

(86) PCT No.: PCT/JP2014/068896
§ 371 (c)(1),
(2) Date: Jan. 12, 2016

(87) PCT Pub. No.: WO2015/016065
PCT Pub. Date: Feb. 5, 2015

(65) Prior Publication Data
US 2016/0148722 A1 May 26, 2016

(30) Foreign Application Priority Data
Aug. 2, 2013 (JP) ................. 2013-161367

(51) Int. Cl.
H01B 5/08 (2006.01)
H01B 7/282 (2006.01)
(Continued)

(52) U.S. Cl.
CPC ......... *H01B 7/2825* (2013.01); *H02G 3/0468* (2013.01); *H02G 3/0487* (2013.01); *H02G 3/06* (2013.01)

(58) Field of Classification Search
CPC .. H01B 7/2825; H02G 3/0468; H02G 3/0487; H02G 3/06
(Continued)

(56) References Cited

U.S. PATENT DOCUMENTS 3,035,113 A * 5/1962 Danchuk .................. H01R 4/72
156/49
3,897,127 A * 7/1975 Haitmanek ............ H01R 4/646
174/78
(Continued)

FOREIGN PATENT DOCUMENTS

| JP | 2006-310127 A | 11/2006 |
| JP | 2007-080692 A | 3/2007 |
| JP | 2010-040396 A | 2/2010 |

OTHER PUBLICATIONS

Oct. 14, 2014 Search Report issued in International Patent Application No. PCT/JP2014/068896.

*Primary Examiner* — Steven T Sawyer
(74) *Attorney, Agent, or Firm* — Oliff PLC

(57) ABSTRACT

Infiltration of water into a shield pipe is prevented. A shielded conductive path includes a tubular braided wire, a shield pipe connected to the braided wire, an electric wire bundle inserted into the braided wire and the shield pipe, a heat-shrinkable tube that is disposed so as to cover the braided wire and is thermally shrunk to bring the braided wire into intimate contact with an outer circumference of the electric wire bundle, a filler (18) with which voids between the electric wire bundle and the heat-shrinkable tube are filled, and a tubular waterstopping member that covers a region of the braided wire between the heat-shrinkable tube and the shield pipe in a state in which two end portions of the tubular waterstopping member are in intimate contact with an outer circumferential surface of the heat-shrinkable tube and the outer circumferential surface of the shield pipe in a liquidtight manner.

16 Claims, 3 Drawing Sheets

(51) Int. Cl.
*H02G 3/04* (2006.01)
*H02G 3/06* (2006.01)

(58) Field of Classification Search
USPC .................................................. 174/128.1
See application file for complete search history.

(56) References Cited

U.S. PATENT DOCUMENTS

| | | | | |
|---|---|---|---|---|
| 5,691,506 | A * | 11/1997 | Miyazaki | H01R 4/646 |
| | | | | 174/652 |
| 6,239,373 | B1 * | 5/2001 | Sato | H01R 4/723 |
| | | | | 174/75 C |
| 2008/0156516 | A1 | 7/2008 | Watanabe | |
| 2013/0126232 | A1 * | 5/2013 | Sakuma | H01B 7/2825 |
| | | | | 174/72 A |

* cited by examiner

SHIELDED CONDUCTIVE PATH

CROSS-REFERENCE TO RELATED APPLICATIONS

This application is a National Stage application of International Application No. PCT/JP2014/068896, filed on Jul. 16, 2014, and claims priority to Japanese Patent Application No. 2013-161367 filed on Aug. 2, 2013, the disclosures of both of which are incorporated herein by reference in their entireties.

TECHNICAL FIELD

Embodiments of the present application relate to a shielded conductive path having waterproof performance.

BACKGROUND

JP 2010-040396A discloses a shielded conductive path of a form in which a tubular braided wire and a shield pipe are connected to each other and an electric wire bundle is inserted into this braided wire and the shield pipe. A region of the shielded conductive path that is covered with the braided wire can be freely bent and routed.

SUMMARY OF THE INVENTION

The above shielded conductive path has a structure in which water can infiltrate between the outer circumference of the electric wire bundle and the inner circumference of the shield pipe because water can freely flow through the braided wire from the outer circumferential side to the inner circumferential side. If water infiltrates into the shield pipe, there is a risk that frozen infiltrating water damages the coating of the electric wire bundle during vehicle vibration, and therefore, a countermeasure is needed.

The embodiments of the present application were made based on the foregoing circumstances, and it is an object thereof to prevent infiltration of water into the shield pipe in a shielded conductive path of a form in which the tubular braided wire and the shield pipe are connected to each other and the electric wire bundle is inserted into the braided wire and the shield pipe.

A shielded conductive path of the embodiments of the present application includes a tubular braided wire, a shield pipe that is connected to the braided wire, an electric wire bundle that is inserted into the braided wire and the shield pipe, a heat-shrinkable tube that is disposed so as to cover the braided wire and is thermally shrunk to bring the braided wire into intimate contact with an outer circumference of the electric wire bundle, a filler with which a void between the electric wire bundle and the heat-shrinkable tube is filled, and a tubular waterstopping member that covers a region of the braided wire between the heat-shrinkable tube and the shield pipe in a state in which two end portions of the tubular waterstopping member are in intimate contact with an outer circumferential surface of the heat-shrinkable tube and an outer circumferential surface of the shield pipe in a liquidtight manner.

A filler stops water in a liquidtight manner in a void between the outer circumference of the electric wire bundle and the inner circumference of the heat-shrinkable tube. A tubular waterstopping member covers a region of the braided wire between the heat-shrinkable tube and the shield pipe, and stops water. Accordingly, it is possible to prevent infiltration of water between the outer circumference of the electric wire bundle and the inner circumference of the shield pipe.

DETAILED DESCRIPTION (1) In the shielded conductive path of the embodiments of the present application, the filler may be applied onto a region of an outer circumference of the braided wire that is adjacent to an end portion of the thermally shrunk heat-shrinkable tube, and pressure may be applied to the applied filler after a tape is wound around the filler, and the filler may be pushed into the heat-shrinkable tube so that the void is filled with the filler. With this configuration, the heat-shrinkable tube can be reliably filled with the filler even after the heat-shrinkable tube is thermally shrunk.

(2) In the shielded conductive path of the embodiments of the present application according to (1), a portion of the filler remaining on an outside of the heat-shrinkable tube may be covered with the tape. With this configuration, there is no risk that the filler interferes with the tubular waterstopping member and is shaved away. In addition, it is possible to prevent leakage of the filler out of the heat-shrinkable tube.

(3) In the shielded conductive path of the embodiments of the present application, the tubular waterstopping member includes a first tube member that is made of rubber and comes into intimate contact with the outer circumferential surface of the heat-shrinkable tube, a second tube member that is made of rubber and comes into intimate contact with the outer circumferential surface of the shield pipe, and a corrugated tube that couples the first tube member and the second tube member. With this configuration, when the electric wire bundle is routed along a bent path, forming the bent path in a region covered with the corrugated tube makes it possible to avoid improper deformation of the first tube member and the second tube member, and therefore, there is no risk that seal performance of the first tube member and the second tube member is deteriorated.

Embodiment 1

Figure 1:
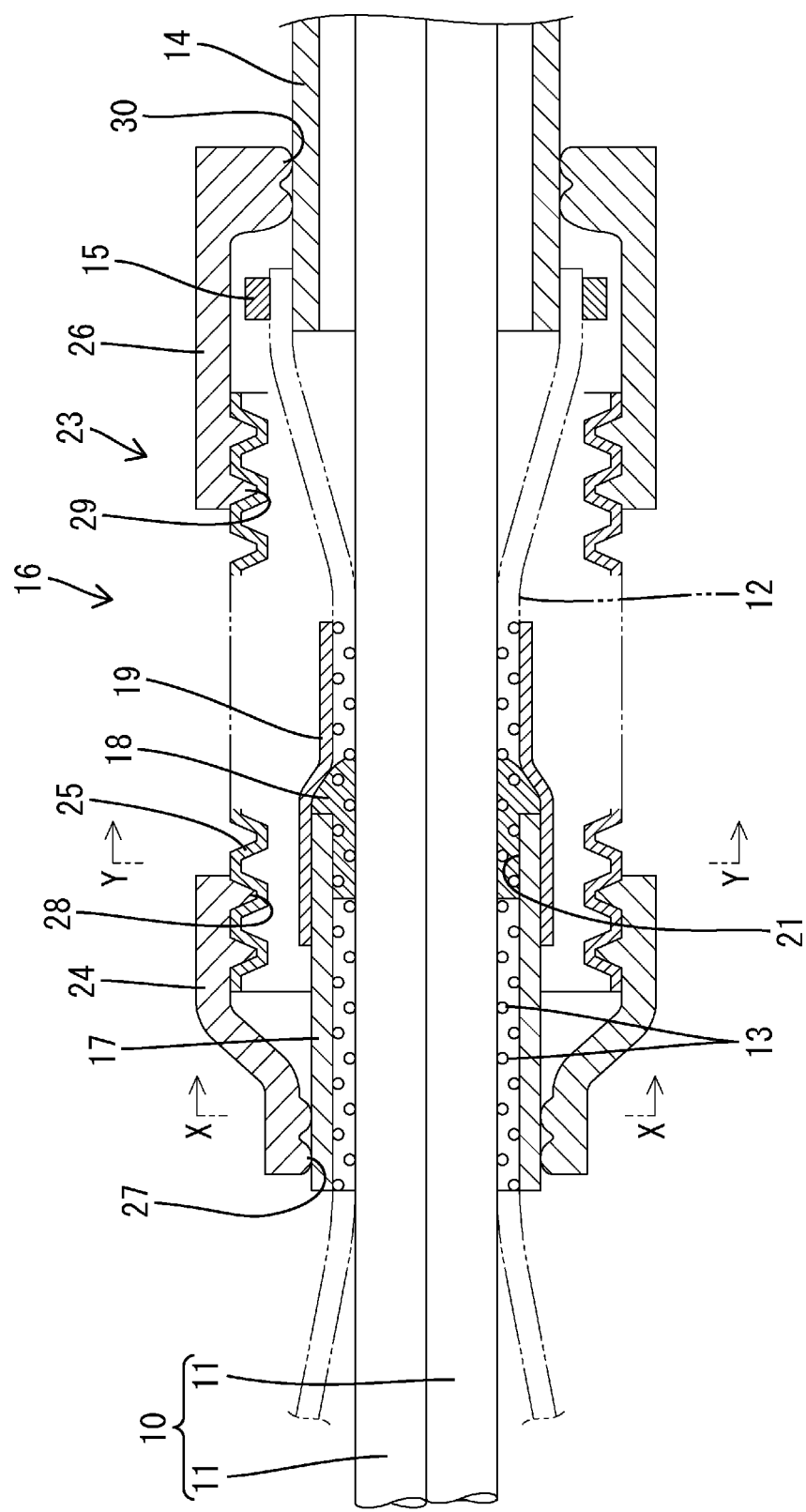
FIG. 1 is a cross-sectional view of a shielded conductive path of Embodiment 1.
Figure 2:
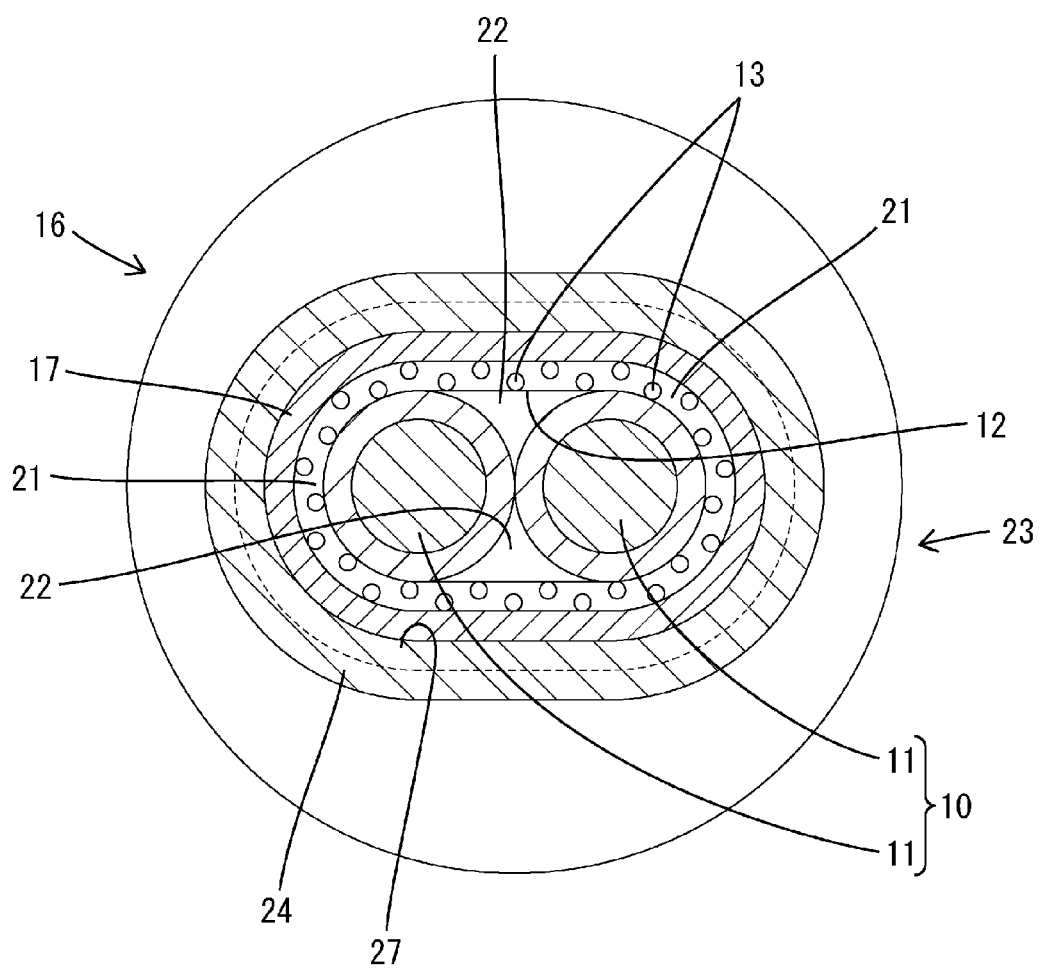
FIG. 2 is a cross-sectional view taken along line X-X in FIG. 1.
Figure 3:
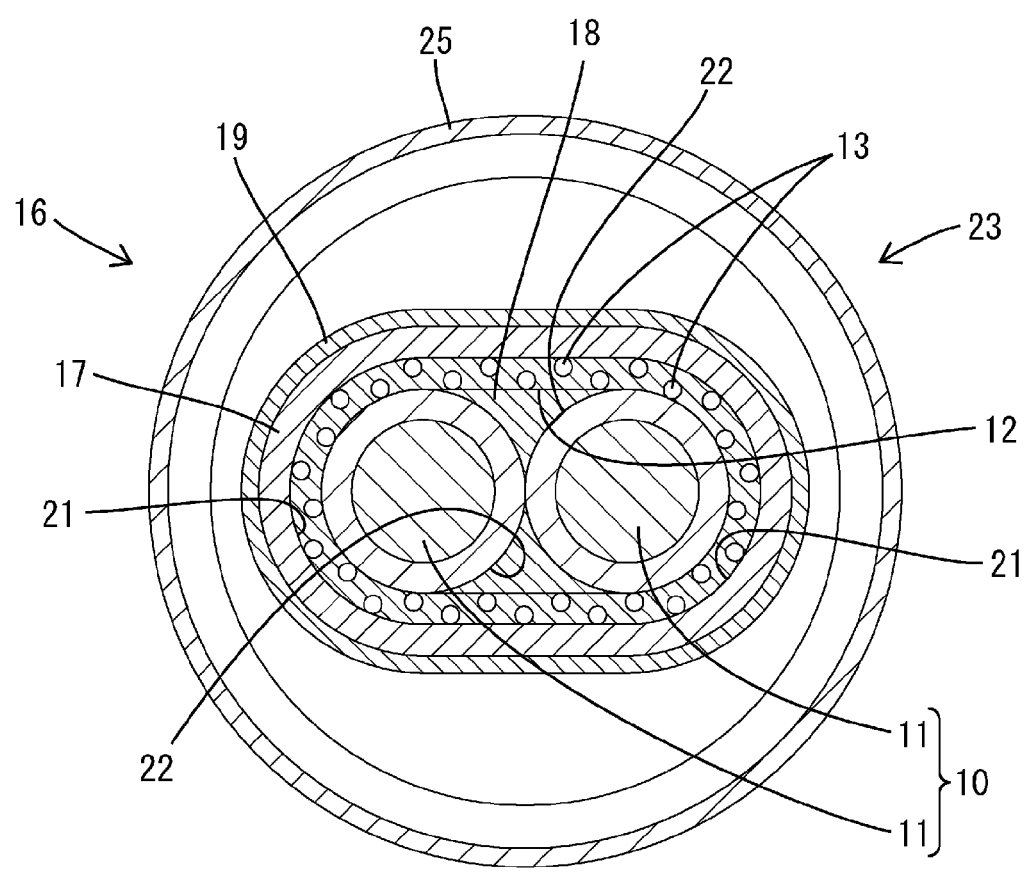
FIG. 3 is a cross-sectional view taken along line Y-Y in FIG. 1.

Hereinafter, Embodiment 1, in which the present application is embodied, will be described with reference to FIGS. 1 to 3. The shielded conductive path of this embodiment includes an electric wire bundle 10, a tubular braided wire 12 as a shield means, a shield pipe 14 also serving as a shield means, and a waterproofing means 16. It should be noted that in terms of a front-rear direction in the description below, the left side in FIG. 1 is defined as the "front side" for the sake of convenience.

The electric wire bundle 10 is obtained by bundling two coated electric wires 11 such that they are in parallel with and adjacent to each other. The braided wire 12 is obtained by braiding a plurality of wires 13 made of a metal material such as copper into a tubular shape. The rear end portion of the braided wire 12 covers the front end portion of the shield pipe 14 and is secured thereto by a crimp ring 15 so that electrical conduction can be established. The shield pipe 14 is made of a metal material such as aluminum, and has a function of protecting the electric wire bundle 10 from damage and the like due to interference of foreign matter, and a function of shielding the electric wire bundle 10. The electric wire bundle 10 is inserted into the braided wire 12 and the shield pipe 14.

The waterproofing means 16 includes a heat-shrinkable tube 17, a filler 18, a tape 19, and a tubular waterstopping member 23. Before thermally shrunk, the heat-shrinkable tube 17 has a substantially circular cross section, and the inner diameter dimension thereof is set to be larger than the outer diameter dimension of the individual coated electric wires 11. The heat-shrinkable tube 17 is disposed in a region to the front of the shield pipe 14, and covers the braided wire 12 and the electric wire bundle 10. The heat-shrinkable tube 17 is thermally shrunk by being heated to a predetermined temperature such that its diameter is reduced, and brings the braided wire 12 into intimate contact with the outer circumference of the electric wire bundle 10. Since the electric wire bundle 10 is configured by adjacently disposing two coated electric wires 11, the heat-shrinkable tube 17 and a region of the braided wire 12 that is covered with the heat-shrinkable tube 17 have an elongated circular shape as shown in FIGS. 2 and 3.

First voids 21 (the "void" in the claims) that correspond to the thickness of the wires 13 constituting the braided wire 12 are formed between the inner circumferential surface of the heat-shrinkable tube 17 and the two semi-circular outer circumferential regions of the coated electric wires 11 with which the braided wire 12 is in contact. These first voids 21 are continuous from the front end of the heat-shrinkable tube 17 to its rear end. In addition, second voids 22 (the "void" in the claims) that are larger than the first voids 21 are formed between the inner circumferential surface of the heat-shrinkable tube 17 and the four quarter arc-shaped outer circumferential regions of the coated electric wires 11 with which the braided wire 12 is not in contact. Similarly to the first voids 21, these second voids 22 are also continuous from the front end of the heat-shrinkable tube 17 to its rear end.

The filler 18 is made of silicone, and the rear end portions of the first voids 21 and the rear end portions of the second voids 22 are filled with the filler 18. A flow of liquid is blocked in a region filled with the filler 18 between the inner circumference of the heat-shrinkable tube 17 and the outer circumference of the electric wire bundle 10 (coated electric wires 11). The tape 19 is tightly wound seamlessly and continuously between a region of the braided wire 12 to the rear of the heat-shrinkable tube 17 and the outer circumference of the rear end portion of the heat-shrinkable tube 17. The tape 19 has a function of applying pressure to the filler 18 to push the filler 18 into the heat-shrinkable tube 17.

As shown in FIG. 1, the tubular waterstopping member 23 includes a front tube member 24 (the "first tube member" in the claims) made of rubber, a corrugated tube 25 made of a synthetic resin, and a rear tube member 26 (the "second tube member" in the claims) made of rubber. The front end portion of the front tube member 24 is shaped so as to have an elongated circular cross section, and lip portions 27 are formed on its inner circumference. The rear end portion of the front tube member 24 is shaped so as to have a circular cross section, and rib-shaped locking portions 28 extending in a circumferential direction is formed on its inner circumference. The corrugated tube 25 is shaped into a bellows shape having a circular cross section over its entire length, and can be freely bent into a form in which its axis is curved.

The rear tube member 26 has a circular cross section over its entire length. Rib-shaped locking portions 29 are formed on the inner circumference of the front end portion of the rear tube member 26, and lip portions 30 are formed on the inner circumference of the rear end portion of the rear tube member 26. The locking portions 28 of the front tube member 24 are locked in a liquidtight manner into groove portions on the outer circumference of the front end portion of the corrugated tube 25, and are fixed into a fitted state by a means such as gluing. The locking portions 29 of the rear tube member 26 are locked in a liquidtight manner into groove portions on the outer circumference of the rear end portion of the corrugated tube 25, and are fixed into a fitted state by a means such as gluing.

The tubular waterstopping member 23 configured in this manner is disposed so as to cover a region of the braided wire 12 between the rear end of the heat-shrinkable tube 17 and the front end of the shield pipe 14. At the front end portion of the tubular waterstopping member 23, the lip portions 27 of the front tube member 24 are fitted in a liquidtight manner onto a region of the outer circumferential surface of the heat-shrinkable tube 17 to the front of the tape 19. At the rear end portion of the tubular waterstopping member 23, the lip portions 30 of the rear tube member 26 are fitted in a liquidtight manner onto the outer circumference of the front end portion of the shield pipe 14. Accordingly, the region of the braided wire 12 between the rear end of the heat-shrinkable tube 17 and the front end of the shield pipe 14 is covered with the tubular waterstopping member 23, and thus no liquid adheres thereto and infiltrates thereinto from the outside.

The above-described waterproofing means 16 is assembled according to the following procedure. First, the heat-shrinkable tube 17, which has not been thermally shrunk yet, is fitted onto the braided wire 12, and then is heated and thermally shrunk at a predetermined position to the front of the shield pipe 14. Next, the filler 18 is applied onto the entire circumference of a region of the outer circumference of the braided wire 12 that is adjacent to the rear end of the heat-shrinkable tube 17. Thereafter, the tape 19 is tightly wound so as to seamlessly and continuously cover the applied filler 18 and the rear end portion of the heat-shrinkable tube 17.

At this time, winding of the tape 19 starts at a position on the braided wire 12 to the rear of the heat-shrinkable tube 17 and the filler 18. After that, the tape 19 is wound around the filler 18, and lastly, around the outer circumference of the heat-shrinkable tube 17. After winding the tape 19, pressure is applied to the tape 19 from the outer circumferential side. The filler 18 to which pressure has been applied is pushed into between the inner circumference of the heat-shrinkable tube 17 and the electric wire bundle 10 (coated electric wires 11), and thus the first voids 21 and the second voids 22 are filled with the filler 18. Lastly, the tubular waterstopping member 23 is attached to the front end portion of the heat-shrinkable tube 17 and the front end portion of the shield pipe 14.

The shielded conductive path of this embodiment is in a form in which the tubular braided wire 12 and the shield pipe 14 are connected to each other and the electric wire bundle 10 is inserted into the braided wire 12 and the shield pipe 14, and has a function of preventing infiltration of water into the shield pipe 14. The shielded conductive path includes the heat-shrinkable tube 17, the filler 18 and the tubular waterstopping member 23 as a means for preventing infiltration of water into the shield pipe 14. The heat-shrinkable tube 17 is disposed so as to cover the braided wire 12, and the thermally shrunk heat-shrinkable tube 17 brings the braided wire 12 into intimate contact with the outer circumference of the electric wire bundle 10. That is, the braided wire 12 is sandwiched between the outer circumference of the electric wire bundle 10 and the inner circumference of the heat-shrinkable tube 17. The voids 21 and 22 are located between the outer circumference of the electric wire bundle 10 and the inner circumference of the heat-shrinkable tube 17.

Therefore, the voids 21 and 22 between the outer circumference of the electric wire bundle 10 and the inner circumference of the heat-shrinkable tube 17 are filled with the filler 18. The tubular waterstopping member 23 covers a region of the braided wire 12 between the rear end of the heat-shrinkable tube 17 and the front end of the shield pipe 14 in a state in which the front end portion of the tubular waterstopping member 23 is in intimate contact with the outer circumferential surface of the heat-shrinkable tube 17 in a liquidtight manner and its rear end portion is in intimate contact with the outer circumferential surface of the shield pipe 14 in a liquidtight manner. With this configuration, the filler 18 stops water in a liquidtight manner in the voids 21 and 22 between the outer circumference of the electric wire bundle 10 and the inner circumference of the heat-shrinkable tube 17. The tubular waterstopping member 23 covers the region of the braided wire 12 between the rear end of the heat-shrinkable tube 17 and the front end of the shield pipe 14, and stops water. Accordingly, it is possible to prevent infiltration of water between the outer circumference of the electric wire bundle 10 and the inner circumference of the shield pipe 14.

In the shielded conductive path of this embodiment, the filler 18 is applied onto a region of the outer circumference of the braided wire 12 that is adjacent to the rear end portion of the thermally shrunk heat-shrinkable tube 17, pressure is applied to the applied filler 18 after the tape 19 is wound around the filler 18, and thus the filler 18 is pushed into the heat-shrinkable tube 17 so that the voids 21 and 22 are filled with the filler 18. With this configuration, the heat-shrinkable tube 17 can be reliably filled with the filler 18 even after the heat-shrinkable tube 17 is thermally shrunk.

Since a portion of the filler 18 remaining on the outside of the heat-shrinkable tube 17 on the rear side is covered with the tape 19, there is no risk that the filler 18 interferes with the corrugated tube 25 (tubular waterstopping member 23) and is shaved away. Furthermore, it is possible to prevent the filler 18 pushed into the voids 21 and 22 from leaking to the outside of the heat-shrinkable tube 17 on the rear side.

The tubular waterstopping member 23 includes the front tube member 24, which is made of rubber and comes into intimate contact with the outer circumferential surface of the heat-shrinkable tube 17, the rear tube member 26, which is made of rubber and comes into intimate contact with the outer circumferential surface of the shield pipe 14, and the corrugated tube 25, which couples the front tube member 24 and the rear tube member 26 and is bendable. With this configuration, when the electric wire bundle 10 is routed along a bent path, forming the bent path in a region covered with the corrugated tube 25 makes it possible to avoid improper deformation of the front tube member 24 and the rear tube member 26, which are made of rubber, and therefore, there is no risk that seal performance of the front tube member 24 and the rear tube member 26 is deteriorated.

Other Embodiments

The present application is not limited to the embodiment, which has been described using the foregoing description and the drawings, and, for example, embodiments as described below are also encompassed within the technical scope of the present application.

(1) Although, in the above embodiment, the inner circumferential side of the heat-shrinkable tube was filled with the filler after the heat-shrinkable tube was thermally shrunk, the filler may be applied onto the inner circumference of the heat-shrinkable tube or the outer circumference of the braided wire before the heat-shrinkable tube is thermally shrunk.

(2) Although only the end portion on the shield pipe side of the two end portions of the heat-shrinkable tube was filled with the filler in the above embodiment, only the end portion of the heat-shrinkable tube on the side opposite to the shield pipe, both the end portions of the heat-shrinkable tube, the central portion of the heat-shrinkable tube in the length direction, or the range over the entire length of the heat-shrinkable tube may be filled with the filler.

(3) Although the tape was wound so as to cover the filler in the above embodiment, the filler need not be covered with the tape.

(4) Although silicone was used as the filler in the above embodiment, a material (such as hot melt) other than silicone may be used as the filler as long as the material can enter the voids in the braided wire and exhibit a waterstopping function.

(5) Although the electric wire bundle was constituted by two electric wires in the above embodiment, the electric wire bundle may be constituted by three or more electric wires.

(6) Although the tubular waterstopping member was constituted by the corrugated tube made of a synthetic resin and a pair of front and rear tube members made of rubber in the above embodiment, the number of parts constituting the tubular waterstopping member may be one, two, or four or more.

Further, although specific embodiments have been illustrated and described herein, those of ordinary skill in the art appreciate that any arrangement which is calculated to achieve the same purpose may be substituted for the specific embodiments shown and that embodiments of the invention have other applications in other environments. The present application is intended to cover any adaptations or variations of the present inventions.

The following claims are in no way intended to limit the scope of embodiments of the invention to the specific embodiments described herein.

LIST OF REFERENCE NUMERALS

10 . . . Electric wire bundle
12 . . . Braided wire
14 . . . Shield pipe
17 . . . Heat-shrinkable tube
18 . . . Filler
19 . . . Tape
21 . . . First void (void)
22 . . . Second void (void)
23 . . . Tubular waterstopping member
24 . . . Front tube member (first tube member)
25 . . . Corrugated tube
26 . . . Rear tube member (second tube member)

The invention claimed is:
1. A shielded conductive path comprising:
a tubular braided wire;
a shield pipe that is made of metal and connected to the braided wire;

an electric wire bundle that is inserted into the braided wire and the shield pipe;
a heat-shrinkable tube that is disposed so as to cover the braided wire and is thermally shrunk to bring the braided wire into intimate contact with an outer circumference of the electric wire bundle;
a filler with which a void between the electric wire bundle and the heat-shrinkable tube is filled; and
a tubular waterstopping member that covers a region of the braided wire between the heat-shrinkable tube and the shield pipe in a state in which two end portions of the tubular waterstopping member are in intimate contact with an outer circumferential surface of the heat-shrinkable tube and an outer circumferential surface of the shield pipe in a liquidtight manner.

2. The shielded conductive path according to claim 1, wherein the filler is applied onto a region of an outer circumference of the braided wire that is adjacent to an end portion of the thermally shrunk heat-shrinkable tube, and
pressure is applied to the applied filler after a tape is wound around the filler, and the filler is pushed into the heat-shrinkable tube so that the void is filled with the filler.

3. The shielded conductive path according to claim 2, wherein a portion of the filler remaining on an outside of the heat-shrinkable tube is covered with the tape.

4. The shielded conductive path according to claim 1, wherein the tubular waterstopping member comprises:
a first tube member that is made of rubber and comes into intimate contact with the outer circumferential surface of the heat-shrinkable tube;
a second tube member that is made of rubber and comes into intimate contact with the outer circumferential surface of the shield pipe; and
a corrugated tube that couples the first tube member and the second tube member.

5. The shielded conductive path according to claim 2, wherein the tubular waterstopping member comprises:
a first tube member that is made of rubber and comes into intimate contact with the outer circumferential surface of the heat-shrinkable tube;
a second tube member that is made of rubber and comes into intimate contact with the outer circumferential surface of the shield pipe; and
a corrugated tube that couples the first tube member and the second tube member.

6. The shielded conductive path according to claim 3, wherein the tubular waterstopping member comprises:
a first tube member that is made of rubber and comes into intimate contact with the outer circumferential surface of the heat-shrinkable tube;
a second tube member that is made of rubber and comes into intimate contact with the outer circumferential surface of the shield pipe; and
a corrugated tube that couples the first tube member and the second tube member.

7. A shielded conductive path comprising:
a tubular braided wire extending in a longitudinal direction;
a shield pipe that is made of metal and connected to the braided wire by having an end portion covered by a first portion of the braided wire;
an electric wire bundle that is inserted into the braided wire and the shield pipe;
a heat-shrinkable tube that covers a second portion of the braided wire and is thermally shrunk to bring the braided wire into intimate contact with an outer circumference of the electric wire bundle, the second portion being at a different location in the longitudinal direction from the first portion;
a filler that fills a void between the electric wire bundle and the heat-shrinkable tube; and
a tubular waterstopping member that covers a region of the braided wire between the heat-shrinkable tube and the shield pipe, two end portions of the tubular waterstopping member being in intimate contact with an outer circumferential surface of the heat-shrinkable tube and an outer circumferential surface of the shield pipe, respectively, in a liquidtight manner.

8. The shielded conductive path according to claim 7, further comprising a tape,
wherein the filler is applied onto a region of an outer circumference of the braided wire that is adjacent to an end portion of the thermally shrunk heat-shrinkable tube,
the tape is wound around the filler, and
the filler fills the void by being pushed with pressure into the end portion of the heat-shrinkable tube.

9. The shielded conductive path according to claim 8, wherein a portion of the filler that is not pushed into the heat-shrinkable tube remains on an outside of the end portion of the heat-shrinkable tube, and
the tape covers the end portion of the heat-shrinkable tube and the remaining portion of the filler.

10. The shielded conductive path according to claim 7, wherein the tubular waterstopping member comprises:
a first tube member that is made of rubber and comes into intimate contact with the outer circumferential surface of the heat-shrinkable tube;
a second tube member that is made of rubber and comes into intimate contact with the outer circumferential surface of the shield pipe; and
a corrugated tube that couples the first tube member and the second tube member.

11. The shielded conductive path according to claim 7, wherein the filler completely fills, in a liquidtight manner, all voids between the electric wire bundle and the heat-shrinkable tube at a longitudinal section of the shielded conductive path.

12. A method of manufacturing a shielded conductive path, the shielded conductive path including a tubular braided wire extending in a longitudinal direction; a shield pipe that is made of metal and connected to the braided wire by having an end portion covered by a first portion of the braided wire; an electric wire bundle that is inserted into the braided wire and the shield pipe; a heat-shrinkable tube that covers a second portion of the braided wire and is thermally shrunk to bring the braided wire into intimate contact with an outer circumference of the electric wire bundle, the second portion being at a different location in the longitudinal direction from the first portion; a filler that fills a void between the electric wire bundle and the heat-shrinkable tube; and a tubular waterstopping member that covers a region of the braided wire between the heat-shrinkable tube and the shield pipe, two end portions of the tubular waterstopping member being in intimate contact with an outer circumferential surface of the heat-shrinkable tube and an outer circumferential surface of the shield pipe, respectively, in a liquidtight manner, the method comprising:
fitting the heat-shrinkable tube onto the braided wire; and
applying the filler onto an entire circumference of a section of the braided wire.

13. The method according to claim 12, wherein fitting the heat-shrinkable tube onto the braided wire is performed before the heat-shrinkable tube is thermally shrunk, the method further comprising:
- thermally shrinking the heat-shrinkable tube prior to applying the filler.

14. The method according to claim 13, wherein the section is adjacent to an end portion of the thermally shrunk heat-shrinkable tube, the method further comprising:
- winding a tape around the applied filler and a region of the heat-shrinkable tube applied with the filler so as to cover the applied filler and the region of the heat-shrinkable tube; and
- pushing the filler into the heat-shrinkable tube by applying pressure to the applied filler after the tape is wound around the filler so that the void is filled with the filler.

15. The method according to claim 14,
- wherein a portion of the filler remaining on an outside of the heat-shrinkable tube remains covered with the tape.

16. The method according to claim 12, further comprising:
- forming the tubular waterstopping member by forming:
- a first tube member that is made of rubber and comes into intimate contact with the outer circumferential surface of the heat-shrinkable tube;
- a second tube member that is made of rubber and comes into intimate contact with the outer circumferential surface of the shield pipe; and
- a corrugated tube that couples the first tube member and the second tube member.

\* \* \* \* \*